(12) United States Patent
Merrick

(10) Patent No.: US 8,698,746 B1
(45) Date of Patent: Apr. 15, 2014

(54) AUTOMATIC CALIBRATION CURVES FOR A POINTING DEVICE

(75) Inventor: Iain Merrick, London (GB)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 13/455,102

(22) Filed: Apr. 24, 2012

(51) Int. Cl.
  *G06F 3/033* (2013.01)

(52) U.S. Cl.
  USPC ........... 345/159; 345/157; 345/163; 345/167; 345/179; 178/19.05

(58) Field of Classification Search
  CPC .................................. G06F 3/033; G09G 5/08
  USPC ........ 345/179, 156–169, 173–174; 178/19.05
  See application file for complete search history.

(56) References Cited

U.S. PATENT DOCUMENTS

| | | | |
|---|---|---|---|
| 6,195,475 B1 * | 2/2001 | Beausoleil et al. | 382/312 |
| 7,236,156 B2 * | 6/2007 | Liberty et al. | 345/158 |
| 7,239,301 B2 * | 7/2007 | Liberty et al. | 345/158 |
| 7,489,299 B2 * | 2/2009 | Liberty et al. | 345/163 |
| 8,237,657 B2 * | 8/2012 | Liberty et al. | 345/158 |
| 8,313,379 B2 * | 11/2012 | Ikeda et al. | 463/38 |
| 8,456,421 B2 * | 6/2013 | Ni et al. | 345/158 |
| 8,515,707 B2 * | 8/2013 | Joseph et al. | 702/141 |
| 8,576,169 B2 * | 11/2013 | Shaw et al. | 345/158 |
| 8,587,519 B2 * | 11/2013 | Shaw et al. | 345/158 |
| 2002/0177950 A1 * | 11/2002 | Davies | 701/213 |
| 2007/0002015 A1 * | 1/2007 | Mohri et al. | 345/157 |
| 2007/0013657 A1 * | 1/2007 | Banning | 345/157 |
| 2007/0171202 A1 * | 7/2007 | Yang et al. | 345/158 |
| 2007/0247425 A1 * | 10/2007 | Liberty et al. | 345/158 |
| 2009/0085867 A1 * | 4/2009 | Bang et al. | 345/157 |
| 2010/0095773 A1 * | 4/2010 | Shaw et al. | 73/514.31 |
| 2010/0149341 A1 * | 6/2010 | Marks et al. | 348/169 |
| 2010/0261526 A1 * | 10/2010 | Anderson et al. | 463/31 |
| 2011/0095979 A1 * | 4/2011 | Sheng et al. | 345/158 |
| 2011/0163947 A1 * | 7/2011 | Shaw et al. | 345/156 |
| 2011/0279397 A1 * | 11/2011 | Rimon et al. | 345/173 |
| 2012/0038549 A1 * | 2/2012 | Mandella et al. | 345/156 |
| 2013/0169539 A1 * | 7/2013 | Sheng et al. | 345/163 |

\* cited by examiner

*Primary Examiner* — Lun-Yi Lao
*Assistant Examiner* — Kelly B Hegarty
(74) *Attorney, Agent, or Firm* — McDermott Will & Emery LLP

(57) ABSTRACT

A system and method is disclosed for calibrating a pointing device. A virtual movement of a position indicator is generated based on current acceleration parameters of an acceleration curve applied to a physical movement made at a pointing device and terminating at a target action. A plurality of virtual path segments are determined based on the physical movement, and an overall error representative of a deviation of the endpoint of each segment from the target action is generated. One or more hypothetical acceleration parameters are calculated that, when applied to the changing position information, generate an overall hypothetical error value less than the overall error. The current acceleration parameters are set equal to the one or more hypothetical acceleration parameters to calibrate the pointing device.

20 Claims, 9 Drawing Sheets

AUTOMATIC CALIBRATION CURVES FOR A POINTING DEVICE

TECHNICAL FIELD

The subject technology relates generally to computer-assisted pointing devices, namely mouse drivers.

BACKGROUND

A display cursor may move according to an acceleration curve, in response to the movement of a pointing device. For example, when the pointing device is moved at a first speed, the cursor moves at a first corresponding speed, and, when the pointing device is moved at a second speed, the cursor is accelerated (or decelerated) to move at a second speed corresponding to an acceleration curve. The acceleration curve may be manually calibrated based on a size of a display and predetermined parameters set by a software developer. Once the acceleration curve is set, however, its parameters may remain static until the next manual calibration.

SUMMARY

The subject technology provides a device and method for calibrating a pointing device. A computer-implemented method may include receiving changing position information received from a pointing device in response to a physical movement to a target action made at the pointing device, determining a plurality of path segments based on the changing position information, determining a total error value based on a plurality of direction errors corresponding to the plurality of path segments, determining one or more hypothetical acceleration parameters that, when applied to the changing position information, generate an overall hypothetical error value less than the total error value, and setting one or more current acceleration parameters equal to the one or more hypothetical acceleration parameters to calibrate the pointing device.

In another aspect, a system may include a processor and one or more storage media (for example, a memory, hard drive, or the like). The memory may include software for calibrating a pointing device that, when executed by the processor, causes the processor to receive changing position information from a pointing device in response to a physical movement to a target action made at the pointing device, generate a path of line segments based on one or more acceleration parameters applied to the changing position information, determine a segment error for one or more of the line segments based on a difference between an endpoint of the line segment and a location of the target action, each line segment being determined on a new direction of the physical movement, determine a total error based on one or more determined segment errors, determine one or more hypothetical parameters that, when substituted for the one or more acceleration parameters, produces hypothetical segments having a overall hypothetical error less than the total error, and apply the one or more hypothetical parameters to changing position information received from a subsequent movement of the pointing device.

In a further aspect, a machine-readable medium may include machine-executable instructions stored thereon, which when executed by a computing device cause the computing device to perform a method of calibrating a pointing device. In this regard, the method may include determining a plurality of line segments from a movement of a position indicator movement resulting in an action, the position indicator moving at a speed according to an acceleration curve of a pointing device, determining a total error value for the movement based on a corresponding direction error for each of the plurality of line segments, each direction error based on a difference between an endpoint of the line segment and an intended distance to a virtual location associated with the action, determining one or more hypothetical acceleration parameters that, when applied to the acceleration curve, generate an overall hypothetical error value for the position indicator movement that is less than the determined total error value, and adjusting one or more current acceleration parameters of the acceleration curve based on the hypothetical acceleration parameters to calibrate the pointing device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
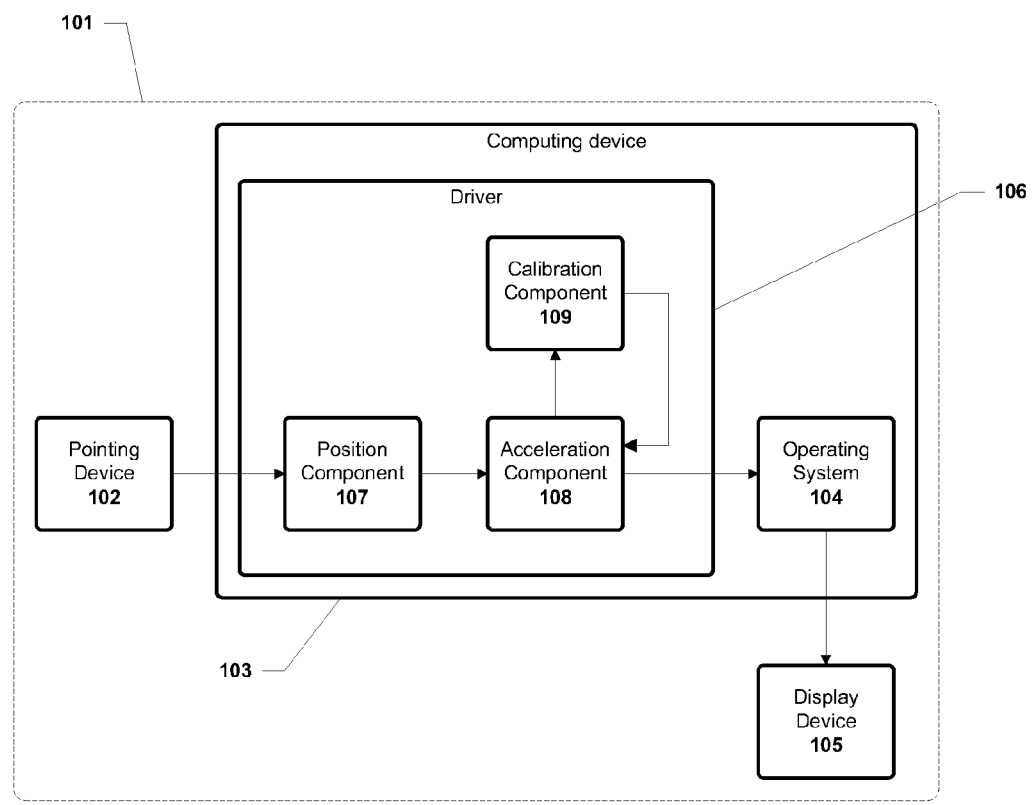
FIG. 1 is a diagram of an example system for calibrating a pointing device according to one aspect of the subject technology.

FIG. 1 is a diagram of an example system for calibrating a pointing device according to one aspect of the subject technology. A system 101 may include a pointing device 102 (for example, a mouse, touch-sensitive pad or display, serial laser pointer, or the like) operably connected to a computing device 103 (for example, a personal or notebook computer, tablet computer, smart phone, PDA, a television or other display device with one or more computing devices embedded therein or attached thereto, or the like). Computing device 103 may include an operating system 104 for displaying application data on a display device 105. In some aspects, pointing device 102, computing device 103, and display device 105 may be integrated as a single device including, for example, a touch sensitive pad or display. Computing device 103 may be configured with a device driver 106 for translating user-initiated movement of pointing device 102 into commands usable by operating system 104 for moving a position indicator (for example, a cursor, on-screen pointer, or the like) on display device 105 to interact with the application data.

In one aspect, software instructions associated with device driver 106 may cause the position indicator to move according to a predetermined acceleration curve (for example, set by a device driver or operating system manufacturer). The acceleration curve may be used by device driver 106 to accelerate or decelerate movement of the position indicator based on position information, received as, for example, signals from pointing device 102. Device driver 106 may include several software components (including, for example, algorithms) for automatically determining (for example, adjusting, calibrating, calculating, or the like) the acceleration curve based on received position information or history of received position information. In this regard, a position component 107 may analyze the received position information to determine a current x-y position, speed, and/or direction of movement. In connection with, for example, periodic timing events (for example, from a clock source), position component 107 may set one or more variables representative of changing position information captured from the movement of pointing device 102.

An acceleration component 108 may store (for example, in a local memory, file system, database, or the like) acceleration parameters, and access the acceleration parameters to generate an acceleration curve for translating the changing position information received from position component 107 into commands to be issued to operating system 104. A calibration component 109 may capture the speed and direction of travel related to a physical movement at pointing device 102 (for example, a mouse movement, gesture, finger swipe, or the like), including changes in the direction of travel towards a final target action from acceleration component 108. The final target action may be a click event received from pointing device 102 (for example, a click of a button, a mouse click, a finger tap on a touch-sensitive pad or display, or the like) that corresponds to a specific location on the display (for example, a location of one or more pixels displayed on the display). As will be described further, calibration component 109 may include an algorithm for dynamically adjusting current acceleration parameters of the acceleration curve to modify how the position indicator moves relative to a corresponding movement at pointing device 102.

Figure 2:
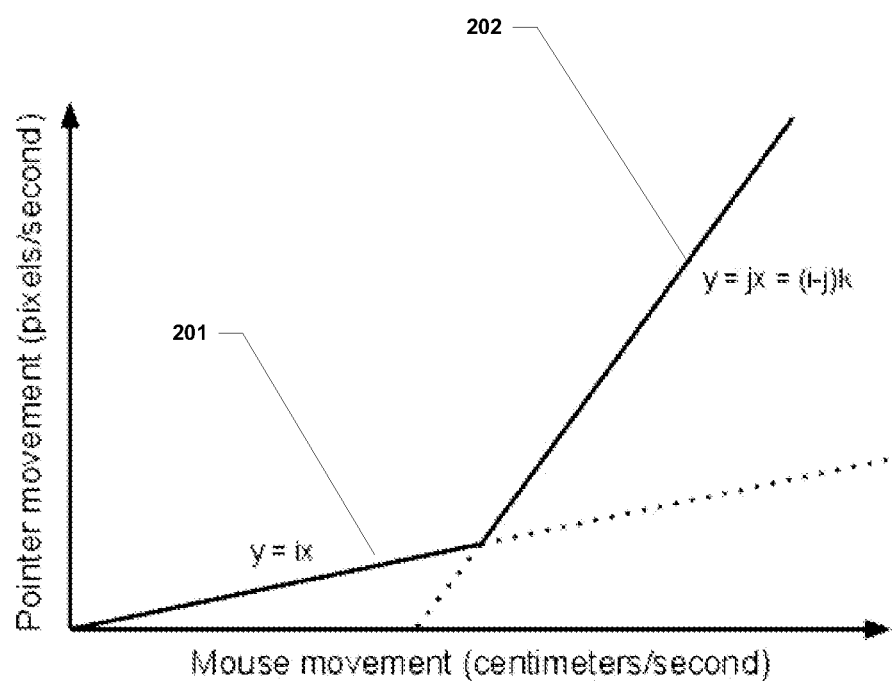
FIG. 2 is a diagram of a first exemplary acceleration curve according to one aspect of the subject technology.

FIG. 2 is a diagram of a first exemplary acceleration curve according to one aspect of the subject technology. The movement of the position indicator in response to position information may be non-linear. For example, movement of the position indicator in response to a physical movement at or above a predetermined speed may be boosted, or "accelerated" to enable a user of the pointing device to make large movements across the screen, or fine adjustments to those movements. An acceleration curve may include, for example, two straight lines 201 and 202, each generally described by the formula y=ax+b. In the depicted example, a first line 201 intersects the origin and has a constant b equal to 0. In this regard, first line 201 may be represented by y=ix. In the depicted example, first line 201 may intersect with a second line 202 at x=k. A slope of second line 202 may be j, such that an equation of the second line is y=jx+(i−j)k. Accordingly, an equation of a full acceleration curve may be:

$$y = \begin{cases} ix & \text{if } x < k \\ jx + (i-j)k & \text{otherwise} \end{cases}$$

where
x=mouse velocity (cm/s)
y=pointer velocity (px/s)
The three coefficients i, j, and k may represent variable acceleration parameters for determining how the position indicator responds to a movement at the pointing device. The parameters may be stored by calibration component 109 in a memory of computing device 101, for example, as a data file in a file system, data in a memory-resident object, in one or more database tables, or the like. Acceleration component 108 may periodically access the acceleration parameters to generate the acceleration curve.

In one aspect, movement at the pointer device may be two-dimensional (for example, along an X and Y axis), such that the acceleration curve may be applied to the magnitude of the movement while keeping its angle constant. In another aspect, a separate set of variables may be assigned to each axis. Without loss of generality, the examples of this disclosure apply the acceleration curve to each axis separately, using the same three variables i, j, and k for each axis. The velocity of the physical movement may be sampled in centimeters/second along the horizontal and vertical axes ($v_h$ and $v_v$). The acceleration curve may be used to calculate a virtual or screen velocity in pixels/second for each axis, with acceleration component 108 updating the position of position indicator appropriately.

Figure 3A:
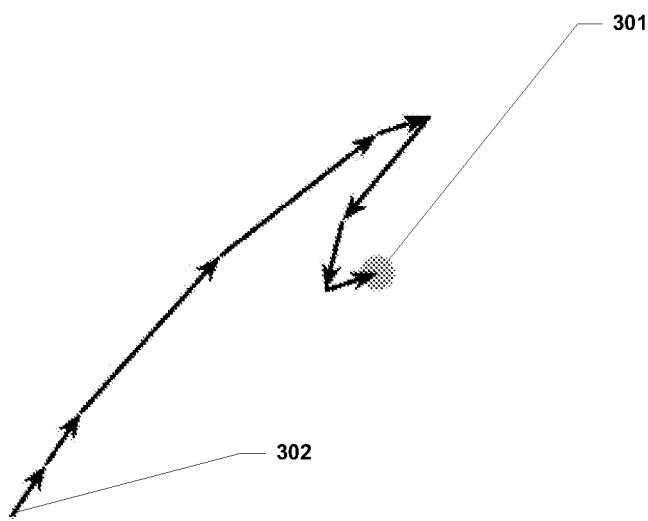
FIGS. 3A to 3D depict an example segmentation of a pointing device movement to a target action according to one aspect of the subject technology.

FIGS. 3A to 3D depict an example segmentation of a pointing device movement to a target action according to one aspect of the subject technology. As depicted by FIG. 3A, pointing device movements generally consist of path segments (for example, straight line segments) that may be, for example, initially large and decreasing in length as the pointer converges towards a target action 301 (for example, a device button press, a pause in movement for over a predetermined period of time, scrolling action, or the like). With poor calibration, the pointer may overshoot or undershoot the target action, requiring more movement of the pointing device to reach the target action. With good calibration, less movement and/or fewer segments may be required (for example, coarse movement to reach the general area, fine movement to reach the precise target).

Calibration component 109 may determine, in real time, one or more line segments (for example, the length and direction a position indicator moves before changing direction) along a path from a starting point 302 to target action 301. Calibration component 109 may read, for example, post-accelerated position data provided by acceleration component 108, and then may group the raw x-y data into straight-line segments. Successive position data representative of movement in substantially the same direction (for example, within a small threshold) may also be grouped together. In one aspect, a change in direction may indicate the start of a new line segment. In another aspect, a change in speed (for example, when pointing device 101 slows down) of more than a predetermined amount may indicate the start of a new line segment. Calibration component 109 may then form groups of "action attempts," which consist of a sequence of line segments followed by a target action, within a small time period (for example, on the order of 2 seconds).

A hypothetical value may be calculated for the acceleration parameters which, when applied to the position information, would minimize the total error for the most recent action attempt. Calibration component 109 may then, after the target action, adjust (for example, incrementally) stored parameters used by acceleration component 108 towards the calculated values. Calibration component 109 and/or acceleration component 108 may limit the maximum adjustment to predetermined bounds to prevent the device becoming unusable after sustained "garbage" input.

With continued reference to FIG. 3A, each change in direction determined by position component 107 may be used to construct a new line segment. In one aspect, line segments may be determined on each significant change in direction (for example, over 15 degrees). In this regard, FIG. 3B may represent three recorded line segments based on the movement illustrated by FIG. 3A. The position indicator is first moved +600 pixels horizontally and +500 pixels vertically before changing direction. The position indicator is then moved −150 pixels horizontally and −250 pixels vertically before changing direction again. The position indicator is then moved +100 pixels horizontally and +50 pixels vertically before target action 301 is reached.

Figure 3B:
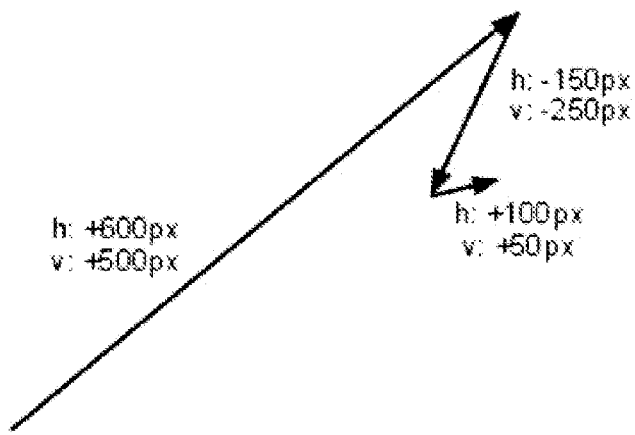
Figure 3C:
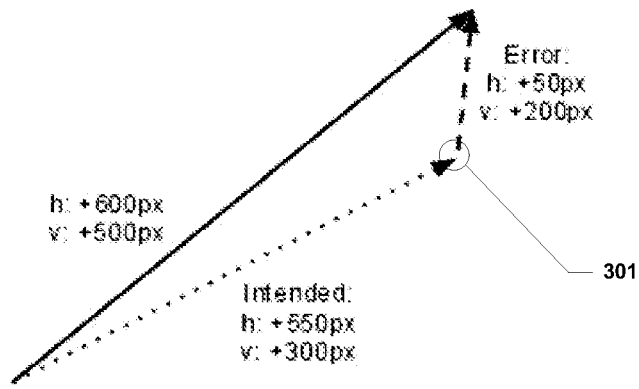
Figure 3D:
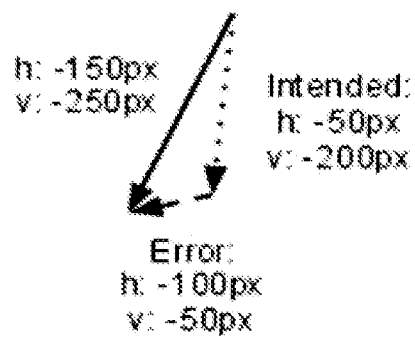

Instead of the non-linear path identified by position component 107 and depicted by FIGS. 3A and 3B, the subject technology may determine that the user intended to move pointing device 102 directly to target action 301. The distance by which the target action 301 was missed may indicate a metric for determining calibration quality (for example, shorter distances are better). FIG. 3C represents a first movement of the position indicator to reach target action 301. Target action 301 is +550 pixels horizontally and +300 pixels vertically from the point of origination. Therefore, the subject technology may determine the intended distance to be 626.5 pixels ($\sqrt{550^2+300^2}$). In the depicted example, the first movement results in a deviation from target action 301 by +50 pixels in a horizontal direction and +200 pixels in a vertical direction. By subtraction, the first movement resulted in a direction error of 206.2 pixels, or 33%. Accordingly, the intended distance from the endpoint of the first movement and target action 301 is 206.2 pixels. The second movement results in a direction error of 111.8 pixels, or 54%.

All but the final line segment will generate a direction error value based on the distance from an endpoint of the line segment to target action 301. The final line segment, having reached target action 301, will have a zero direction error value. In the depicted examples, the third movement reaches target action 301, thereby providing a direction error of 0 pixels, or 0%. A total error value may then be calculated based on a sum of direction error values corresponding to each of the line segments. In the depicted example, the direction errors (as a percentage) for each line segment may be summed to obtain an overall quality score. Accordingly, the previously described direction errors result in an overall quality score of 87%.

There are a number of ways to calculate the error value of an action attempt and the examples given herein are not meant to be exhaustive of all possibilities. The optimum length may, for example, be defined as a length which minimizes the distance to target action 301, without changing the angle of the line segment. In this manner, the absolute error may be defined as a difference between target action 301 and the optimum length. The total error may be defined as the sum of (for example, un-squared) relative errors, the sum of absolute errors, the sum of squared absolute errors, or the like. Rather than weighting each line segment equally in the error calculation, certain line segments (for example, the first or last) may be given greater weight. For example, a calculated error corresponding to the first or last line may be increased by a predetermined multiplier (for example, 1.25, 1.5, 2, or the like).

In another example, each line segment may be interpreted as a discrete attempt by the user to reach target action 301. For each line segment, the algorithm may calculate an optimum length, an absolute error, and a relative error. The optimum length may be the distance between the line's starting point and the target action. The absolute error may be the distance between the target action and the line's endpoint. And, the relative error may be the absolute error divided by the optimum length. The total error value for the attempt to reach the click target may include the sum of squared relative errors of each segment. Phrased another way, each of the plurality of direction errors may be based on a distance between an endpoint of a corresponding line segment and target action 301, divided by a distance between a starting point of the corresponding line segment and target action 301.

As described previously, physical movements at a pointing device may be translated into virtual movements of a position indicator via an acceleration curve defined by variables i, j and k. If these variables were programmed with different values in the previous example, the position indicator would have moved differently and may have reached target action 301 sooner. If the position indicator responded differently, however, the user may have taken that change into account, and may have manipulated the pointing device differently. So, what "would have happened" may not be determined merely by providing different calibration values. Therefore, for each individual line segment, the subject technology may assume that the user's hand gestures would have been the same regardless of the calibration settings.

Calibration may be improved by dynamically determining one or more hypothetical acceleration parameters that, when applied to the acceleration curve, generate a hypothetical error value that is less than the previously described total error value. Since the total error value may only be calculated after the target action, the hypothetical error value is generated by regenerating the previously described line segments as if the prior movement of the position indicator was governed by the hypothetical acceleration curve. In this regard, the hypothetical acceleration parameters may be chosen to redraw the line segments such that the endpoint of the penultimate line segment (for example, the last line segment having an error value) is closest to the target action, thus minimizing the hypothetical error value.

As previously described, each line segment may consist of a sequence of physical movements made at a pointing device, sampled at regular intervals. Each movement may be replayed with different values for i, j and k, and calculate a hypothetical movement of the position indicator. The intended position indicator movement (which, in this example, is unchanged) may be subtracted from the actual movement to obtain a direction error. The percentage of each direction error may then be summed for all line segments to obtain a "best case" hypothetical error value. One or more currently stored acceleration parameters may then be set equal to respective "best case" hypothetical acceleration parameters to adjust the acceleration curve and calibrate the pointing device.

To avoid confusing a user with what may seem like erratic pointer device behavior, the subject technology avoids making large calibration changes. In this regard, each variable may be slightly increased or decreased by a predetermined value e, or left unchanged. This may provide up to, in this example, 27 possibilities:

| i | j | k |
|---|---|---|
| $i+e$ | $j$ | $k$ |
| $i-e$ | $j$ | $k$ |
| $i$ | $j+e$ | $k$ |
| $i+e$ | $j+e$ | $k$ |
| ... | | |

The calibration algorithm may replay each of the three pointing device movements of the FIG. 3B with all 27 combinations, select the combination of parameters that provides the lowest overall hypothetical error value, and then update the acceleration curve with that combination of parameters in preparation for the next input of position information.

There may be some risk that a computer and a user could repeatedly overcompensate back and forward, and never settle down into a stable state. To avoid overcompensation (for example, resulting from the algorithm combined with user-compensation), one or more current acceleration parameters may be adjusted towards the hypothetical acceleration parameters. Rather than setting i, j and k immediately to their optimum values (for example, for a given mouse gesture) the algorithm of the subject technology may make only small adjustments. This means it may require several pointing device movements to converge on the correct settings, but prevents the algorithm from generating values that overshoot by more than e. Second, rather than using only the latest pointing device movement for calibration, the algorithm may use a predetermined number of pointing device movements (for example, three), sum the (hypothetical) scores for the predetermined number of gestures, and adjust the variables so as to minimize this total score. In this regard, a feedback loop between the physical and virtual movements may be smoothed, and the algorithm ensures that a noisy input (for example, if the user accidentally knocks the mouse) does not throw off the calibration.

In some aspects, different acceleration parameters may be stored for each logical direction of a physical movement made at pointing device 101. For example, device driver 103 may store a first parameter set and $i_1$, $j_1$, $k_1$ for translation of movement in the X direction, and store a second parameter set $i_2$, $j_2$, and $k_2$ for translation of movement in the Y direction. In other aspects, rather than calculating the optimum acceleration parameters for the most recent action attempt, calibration component 109 may determine optimum acceleration parameters for the previous N attempts (for example, previous 3 attempts).

The subject technology may incorporate an "auto adjust" option into an operating system's preference panel for pointing device settings. When this option is enabled, calibration component 109 may continually adjust the acceleration parameters as the user moves the mouse. When the option is first enabled, or when the system is used for the first time, calibration component 109 may make large adjustments. As the calibration improves, calibration component 109 may make smaller adjustments. Rather than continuous calibration, calibration component 109 may perform auto-calibration only when specifically requested by the user. In this regard, on receiving a request to calibrate a pointing device, an application associated with the operating system may, for example, prompt the user to click on several targets, and use these as input to the calibration algorithm.

On a standardized hardware platform, the acceleration parameters may be stored in a remote location associated with a user's online account. Then, on the user switching from computing device 101 to a different but functionally similar or identical device, the device driver 106 located on the new device may download the stored acceleration parameters to provide the user with an immediately calibrated pointing device 102. Device driver 106 may characterize the input response of a range of pointing devices 102 used in connection with the user account and automatically translate the user's calibration between devices. This may allow the user to switch to a different type of pointing device and have it be immediately calibrated according to the user's traits or previous use of the device.

Figure 4:
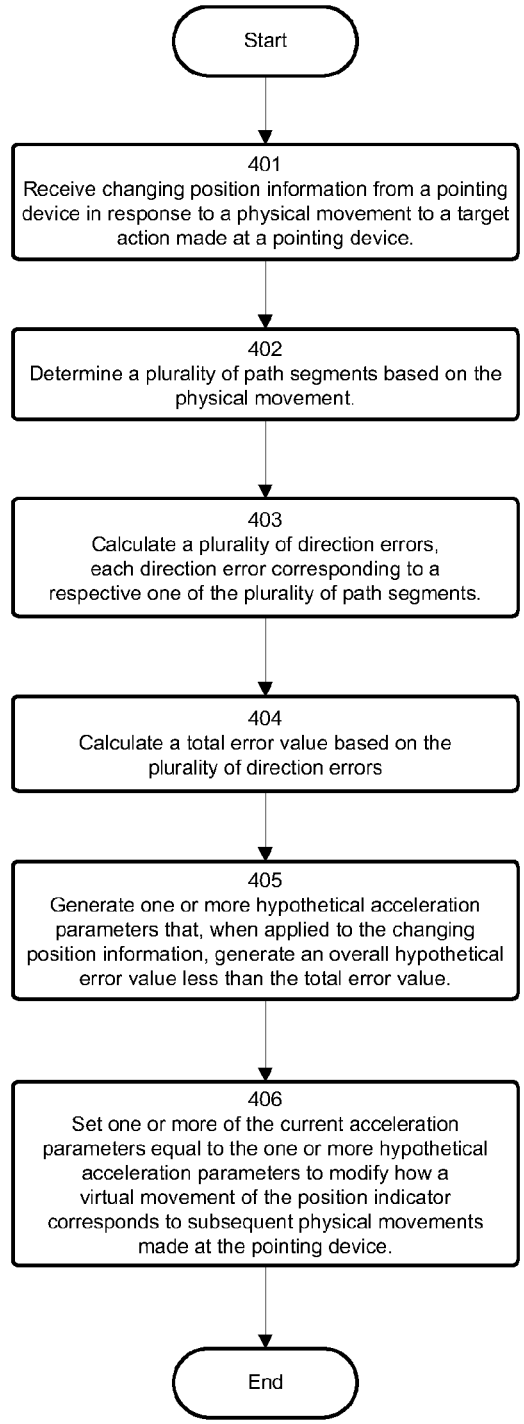
FIG. 4 is a flowchart illustrating an exemplary process for calibrating a pointing device according to one aspect of the subject technology.

FIG. 4 is a flowchart illustrating an exemplary process for calibrating a pointing device according to one aspect of the subject technology. A virtual movement of a position indicator may be generated based on one or more current acceleration parameters applied to changing position information. In step 401, changing position information is received from a pointing device in response to a physical movement to a target action made at the pointing device. The target action may includes a click event received from the pointing device, a pause in the physical movement for more than a predetermined period of time, or the like.

In step 402, a plurality of path segments (for example, line segments) is determined based on the changing position information, and, in step 403, a plurality of direction errors corresponding to the plurality of path segments are calculated. Each direction error may be representative of a deviation from the target action, for example, calculated from the ratio of the original pixel distance to the target action and the number of pixels between the endpoint of the respective path segment. In step 404, a total error value is calculated based on the plurality of direction errors. In step 405, one or more hypothetical acceleration parameters are generated such that, when applied to the changing position information, generate an overall hypothetical error value less than the total error value. In step 406, one or more of the current acceleration parameters are set equal to the one or more hypothetical acceleration parameters to modify how the virtual movement of the position indicator corresponds to subsequent physical movements made at the pointing device.

Figure 5A:
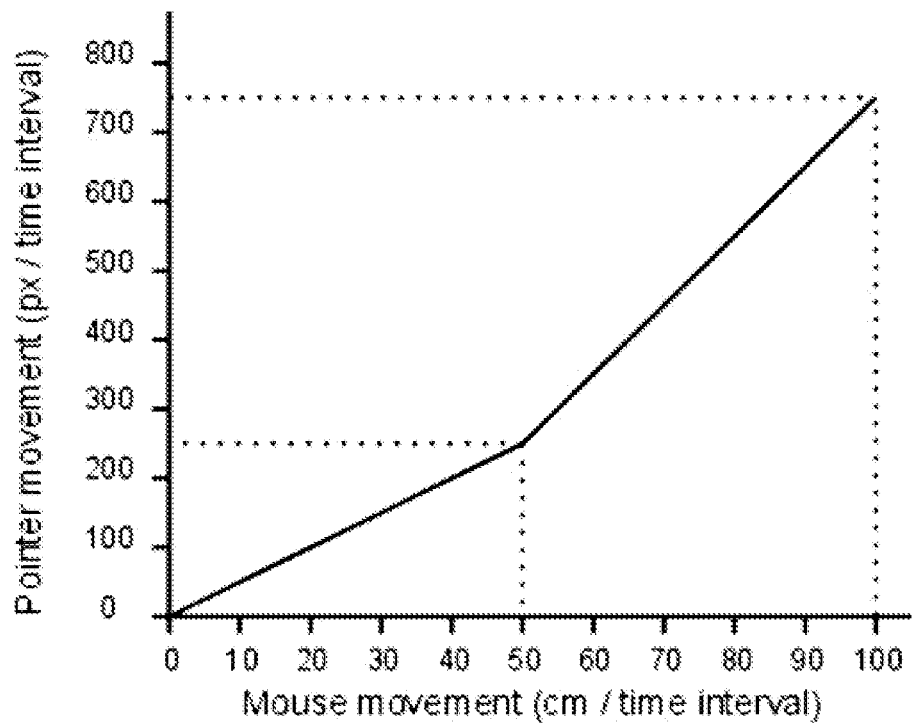
FIGS. 5A to 5E are illustrative of a recalibration of an exemplary acceleration curve based on a physical movement to a target action made at a pointing device according to one aspect of the subject technology.
Figure 5B:
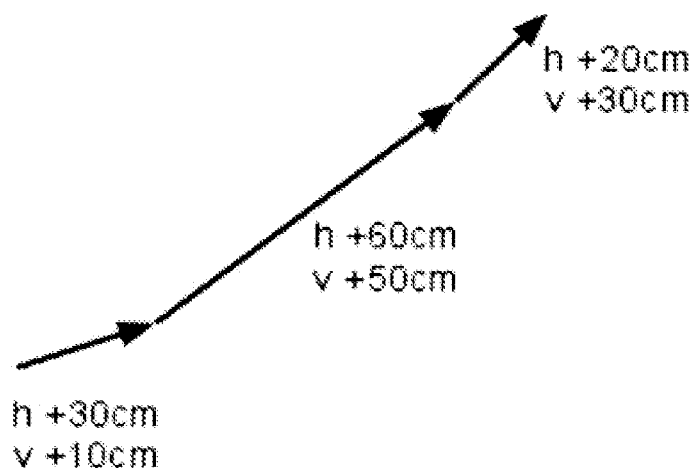
Figure 5C:
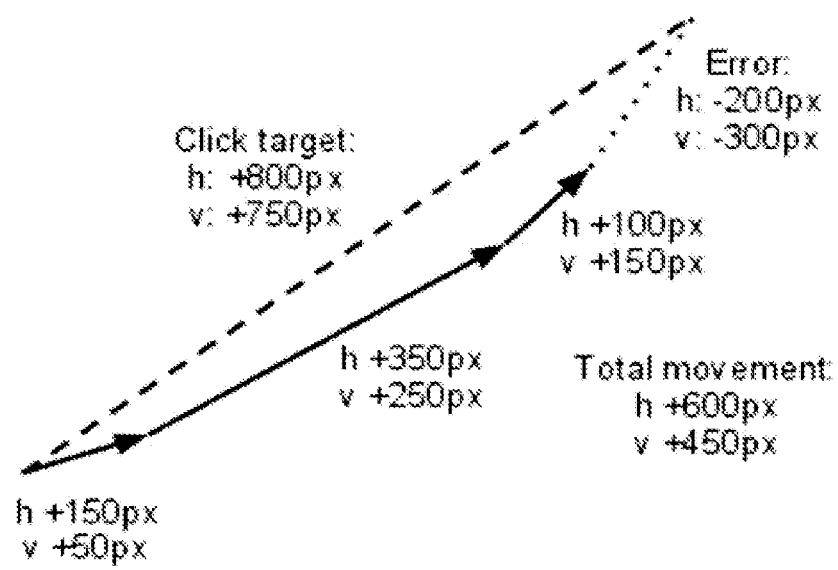

FIGS. 5A to 5E are illustrative of a recalibration of an exemplary acceleration curve based on a physical movement to a target action made at a pointing device according to one aspect of the subject technology. FIG. 5A depicts a first exemplary acceleration curve 401 having acceleration parameters i=5, j=10, and k=50. FIG. 5B depicts an exemplary physical movement of a pointing device (for example, pointing device 102). A user moves the pointing device +30 cm horizontally and +10 cm vertically, then +60 cm horizontally and +50 cm vertically, and then +20 cm horizontally and +30 cm vertically. FIG. 5C depicts an exemplary movement of a position indicator on a display after the acceleration curve of FIG. 5A. is applied. In accordance with the acceleration curve, the movement of the pointing device may result in a movement of the position indicator +150 pixels horizontally and +50 pixels vertically, then +350 pixels horizontally and +250 pixels vertically, and then +100 pixels horizontally and +150 pixels vertically, for a total movement of +600 pixels horizontally and +450 pixels vertically. If the intended target action is 1096.6 pixels away (+800 pixels horizontally and +750 pixels vertically from the starting point) then the user missed the target by 360.6 pixels, providing an overall error of 33%.

Figure 5D:
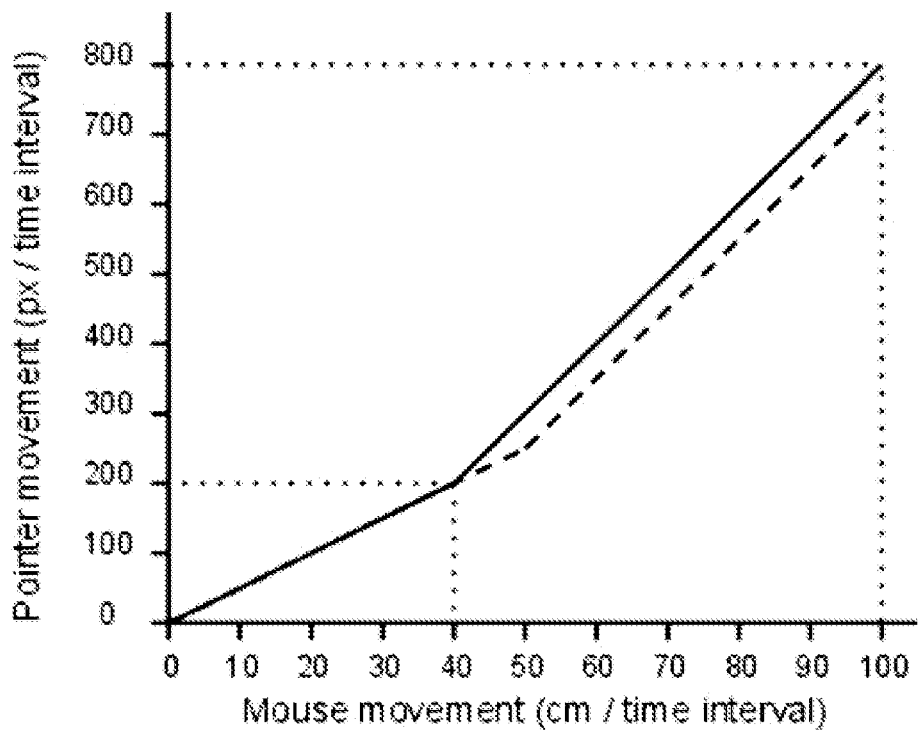
Figure 5E:
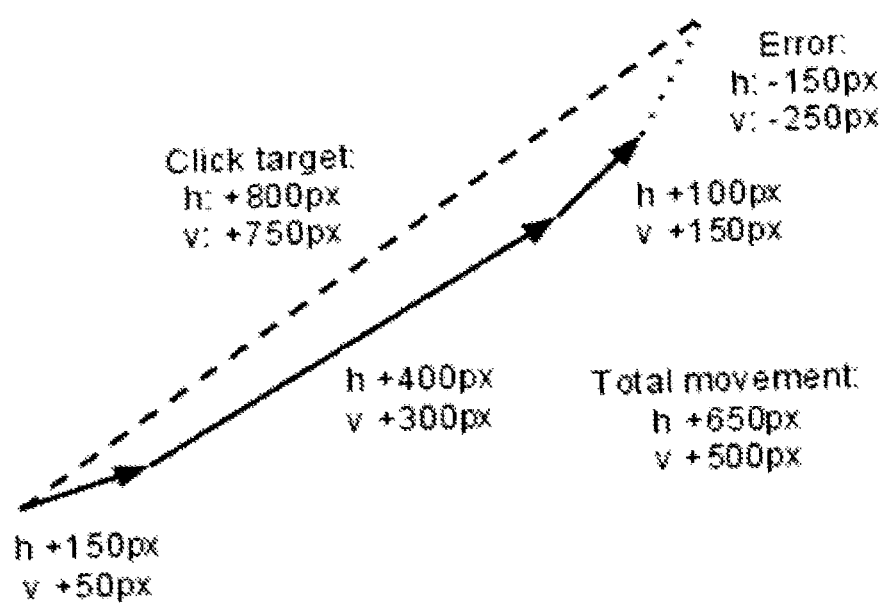

FIG. 5D depicts an exemplary adjusted acceleration curve with the value of acceleration parameter k reduced to 40. The adjusted acceleration curve may be applied to the same physical movement to generate a new hypothetical path, depicted by FIG. 5E. In this example, the movement of the pointing device may result in a hypothetical movement of the position indicator +150 pixels horizontally and +50 pixels vertically, then +400 pixels horizontally and +300 pixels vertically (an increase of 50 pixels in each direction), and then +100 pixels horizontally and +150 pixels vertically, for a total movement of +600 pixels horizontally and +450 pixels vertically. In this manner, the target action is missed by 291.5 pixels ($\sqrt{150^2+250^2}$), generating a hypothetical error value of 27%. If the subject technology determines that a hypothetical error value of 27% is acceptable, the current acceleration parameter k may be set equal to the hypothetical parameter of k=40.

Figure 6:
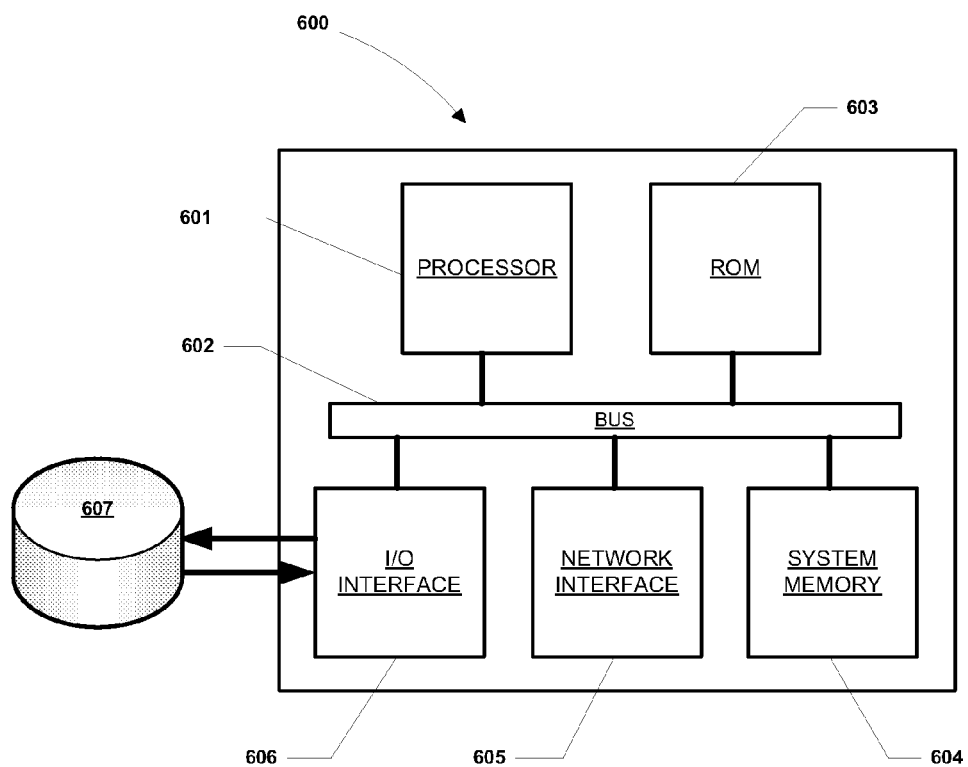
FIG. 6 is a diagram illustrating an exemplary computer-enabled system for calibrating a pointing device, including a processor and other internal components, according to one aspect of the subject technology.

FIG. 6 is a diagram illustrating an exemplary computer-enabled system for calibrating a pointing device, including a processor and other internal components, according to one aspect of the subject technology. In some aspects, a computerized device 600 (for example, computing device 103 or the like) includes several internal components such as a processor 601, a system bus 602, read-only memory 603, system memory 604, network interface 605, I/O interface 606, and the like. In one aspect, processor 601 may also be communicating with a storage medium 607 (for example, a hard drive, database, or data cloud) via I/O interface 606. In some aspects, all of these elements of device 600 may be integrated into a single device. In other aspects, these elements may be configured as separate components.

Processor 601 may be configured to execute code or instructions to perform the operations and functionality described herein, manage request flow and address mappings, and to perform calculations and generate commands. Processor 601 is configured to monitor and control the operation of the components in server 600. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 601. Likewise, one or more sequences of instructions may be software stored and read from system memory 605, ROM 603, or received from a storage medium 607 (for example, via I/O interface 606). ROM 603, system memory 605, and storage medium 607 represent examples of machine or computer readable media on which instructions/code may be executable by processor 601. Machine or computer readable media may generally refer to any medium or media used to provide instructions to processor 601, including both volatile media, such as dynamic memory used for system memory 604 or for buffers within processor 601, and non-volatile media, such as electronic media, optical media, and magnetic media.

In some aspects, processor 601 is configured to communicate with one or more external devices (for example, via I/O interface 606). Processor 601 is further configured to read data stored in system memory 604 and/or storage medium 607 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 604 represents volatile memory used to temporarily store data and information used to manage device 600. According to one aspect of the subject technology, system memory 604 is random access memory (RAM) such as double data rate (DDR) RAM. Other types of RAM also may be used to implement system memory 504. Memory 604 may be implemented using a single RAM module or multiple RAM modules. While system memory 604 is depicted as being part of device 600, those skilled in the art will recognize that system memory 604 may be separate from device 600 without departing from the scope of the subject technology. Alternatively, system memory 604 may be a non-volatile memory such as a magnetic disk, flash memory, peripheral SSD, and the like.

I/O interface 606 may be configured to be coupled to one or more external devices, to receive data from the one or more external devices and to send data to the one or more external devices. I/O interface 606 may include both electrical and physical connections for operably coupling I/O interface 606 to processor 601, for example, via the bus 602. I/O interface 606 is configured to communicate data, addresses, and control signals between the internal components attached to bus 602 (for example, processor 601) and one or more external devices (for example, a hard drive). I/O interface 606 may be configured to implement a standard interface, such as Serial-Attached SCSI (SAS), Fiber Channel interface, PCI Express (PCIe), SATA, USB, and the like. I/O interface 606 may be configured to implement only one interface. Alternatively, I/O interface 606 may be configured to implement multiple interfaces, which are individually selectable using a configuration parameter selected by a user or programmed at the time of assembly. I/O interface 606 may include one or more buffers for buffering transmissions between one or more external devices and bus 602 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for calibrating a pointing device, the method comprising:
    receiving changing position information from a pointing device in response to a physical movement to a target action made at the pointing device;
    determining a plurality of path segments based on the changing position information;
    calculating a plurality of direction errors, each direction error corresponding to a respective one of the plurality of path segments;
    calculating a total error value based on the plurality of direction errors;
    generating one or more hypothetical acceleration parameters that, when applied to the changing position information, generate an overall hypothetical error value less than the total error value; and
    setting one or more of current acceleration parameters equal to the one or more hypothetical acceleration parameters to modify how a virtual movement of a position indicator corresponds to subsequent physical movements made at the pointing device.

2. The computer-implemented method of claim 1, wherein the current acceleration parameters determine an acceleration curve for generating the virtual movement.

3. The computer-implemented method of claim 1, wherein determining the plurality of path segments comprises:
    determining a new path segment based on a change in direction of the changing position information.

4. The computer-implemented method of claim 1, wherein determining the plurality of path segments comprises:
    determining a new path segment based on a change in a speed of the physical movement of more than a predetermined amount.

5. The computer-implemented method of claim 1, wherein the changing position information comprises horizontal and vertical position data, and wherein determining the plurality of path segments based on the changing position information comprises:
    grouping the horizontal and vertical position data into straight line segments.

6. The computer-implemented method of claim 1, wherein the target action includes a click event received from the pointing device.

7. The computer-implemented method of claim 1, wherein the target action includes a pause in the physical movement for more than a predetermined period of time.

8. The computer-implemented method of claim 1, wherein each of the plurality of direction errors is based on a distance between an endpoint of a corresponding path segment and the target action.

9. The computer-implemented method of claim 8, wherein the distance between the endpoint and the target action is a linear distance measured in pixels.

10. The computer-implemented method of claim 9, wherein each of the plurality of direction errors is representative of a percentage based on the linear distance divided by an intended distance, the intended distance measured from a start of the plurality of path segments to the target action.

11. The computer-implemented method of claim 1, wherein each of the plurality of direction errors is based on a distance between an endpoint of a corresponding path segment and the target action divided by a distance between a starting point of the corresponding path segment and the target action.

12. The computer-implemented method of claim 11, determining the total error value comprises:
    generating the square of each of the plurality of direction errors; and
    summing the squared direction errors.

13. The computer-implemented method of claim 1, further comprising:
    generating a plurality of parameter permutations of the one or more hypothetical acceleration parameters, each parameter permutation including one or more uniquely adjusted acceleration parameters;
    applying each parameter permutation to the changing position information to produce a overall permutation error value; and
    selecting the hypothetical acceleration parameters corresponding to the lowest overall permutation error value as the one or more current acceleration parameters.

14. The computer-implemented method of claim 1, wherein the total error value is based on a predetermined number of physical movements to a respective target action.

15. The computer-implemented method of claim 1, wherein a first set of acceleration parameters associated with a horizontal direction of the physical movement is different than a second set of acceleration parameters associated with a vertical direction of the physical movement.

16. A system, comprising:
a processor;
one or more storage media including software for calibrating a pointing device that, when executed by the processor, causes the processor to:
receive changing position information from a pointing device in response to a physical movement to a target action made at the pointing device;
generate a path of line segments based on one or more acceleration parameters applied to the changing position information;
determine a segment error for one or more of the line segments based on a difference between an endpoint of the line segment and a location of the target action, each line segment being determined on a new direction of the physical movement;
determine a total error based on one or more determined segment errors;
determine one or more hypothetical parameters that, when substituted for the one or more acceleration parameters, produces hypothetical segments having a overall hypothetical error less than the total error; and
apply the one or more hypothetical parameters to changing position information received from a subsequent movement of the pointing device.

17. The system of claim 16, wherein the distance between the endpoint and the target action is a linear distance measured in pixels.

18. The system of claim 17, wherein each of the plurality of direction errors is a percentage based on the linear distance divided by an intended distance, the intended distance measured from a start of the plurality of path segments to the location of the target action.

19. The system of claim 16, wherein the software causing the processor to determine one or more hypothetical parameters comprises the software causing the processor to:
generate a plurality of parameter permutations, each parameter permutation including an adjustment to one or more of the acceleration parameters;
generating a new path of line segments and a new total permutation error for each permutation; and
selecting as the one or more hypothetical parameters, parameters of the permutation associated with the lowest new total permutation error.

20. A non-transient machine-readable medium having machine-executable instructions stored thereon, which when executed by a computing device cause the computing device to perform a method of calibrating a pointing device, the method comprising:
determining a plurality of line segments from a movement of a position indicator movement resulting in an action, the position indicator moving at a speed according to an acceleration curve of a pointing device;
determining a total error value for the movement based on a corresponding direction error for each of the plurality of line segments, each direction error based on a difference between an endpoint of the line segment and an intended distance to a virtual location associated with the action;
determining one or more hypothetical acceleration parameters that, when applied to the acceleration curve, generate an overall hypothetical error value for the position indicator movement that is less than the determined total error value; and
adjusting one or more current acceleration parameters of the acceleration curve based on the hypothetical acceleration parameters to calibrate the pointing device.

* * * * *